(12) United States Patent
Ishiguro et al.

(10) Patent No.: US 7,668,142 B2
(45) Date of Patent: Feb. 23, 2010

(54) RADIO COMMUNICATIONS SYSTEM, RADIO COMMUNICATIONS METHOD, RADIO RELAY, AND RADIO TERMINAL

(75) Inventors: Takayuki Ishiguro, Yokosuka (JP); Osamu Nakamura, Yokosuka (JP); Shinji Uebayashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 954 days.

(21) Appl. No.: 10/176,623

(22) Filed: Jun. 24, 2002

(65) Prior Publication Data
US 2002/0196804 A1    Dec. 26, 2002

(30) Foreign Application Priority Data
Jun. 22, 2001    (JP)    ............... 2001-190368

(51) Int. Cl.
*H04B 7/216*    (2006.01)

(52) U.S. Cl. .................. 370/335; 370/342; 370/442

(58) Field of Classification Search ................ 370/442, 370/335–337, 342–347
See application file for complete search history.

(56) References Cited

U.S. PATENT DOCUMENTS 5,355,414 A *  10/1994  Hale et al. .................... 726/34
5,805,581 A *   9/1998  Uchida et al. ............... 370/335
6,445,917 B1 *  9/2002  Bark et al. ................... 455/423
6,496,497 B1 * 12/2002  Lee et al. ..................... 370/342
6,549,524 B1 *  4/2003  Shin ............................ 370/331
6,845,238 B1 *  1/2005  Muller ........................ 455/436

FOREIGN PATENT DOCUMENTS

| JP | 7-212821 | 8/1995 |
| JP | 10-023502 | 1/1998 |
| JP | 10-075473 | 3/1998 |
| JP | 2000-175244 | 6/2000 |
| JP | 2001-136570 | 5/2001 |
| WO | WO 01/20942 | 3/2001 |

* cited by examiner

*Primary Examiner*—Jayanti K Patel
*Assistant Examiner*—Bo Hui A Zhu
(74) *Attorney, Agent, or Firm*—Oblon, Spivak, McClelland, Maier & Neustadt, L.L.P.

(57) ABSTRACT

A radio terminal (10) and a radio relay (20, 30, 40) perform radio communications therebetween by a radio communications system else than a TDMA system, an interference measurer (13a) measures a degree of interference of each of radio slots constituting a radio channel employed in the radio communications system, a decision maker (13b, 13c) makes a decision, depending on a measurement result of the degree of interference, whether or not the radio communications by the radio communications system is able to be continued, and a switcher (42) switches, as the decision is made of the radio communications by the radio communications system to be unable to be continued, the radio communications system to a radio communications system of the TDMA system.

8 Claims, 6 Drawing Sheets

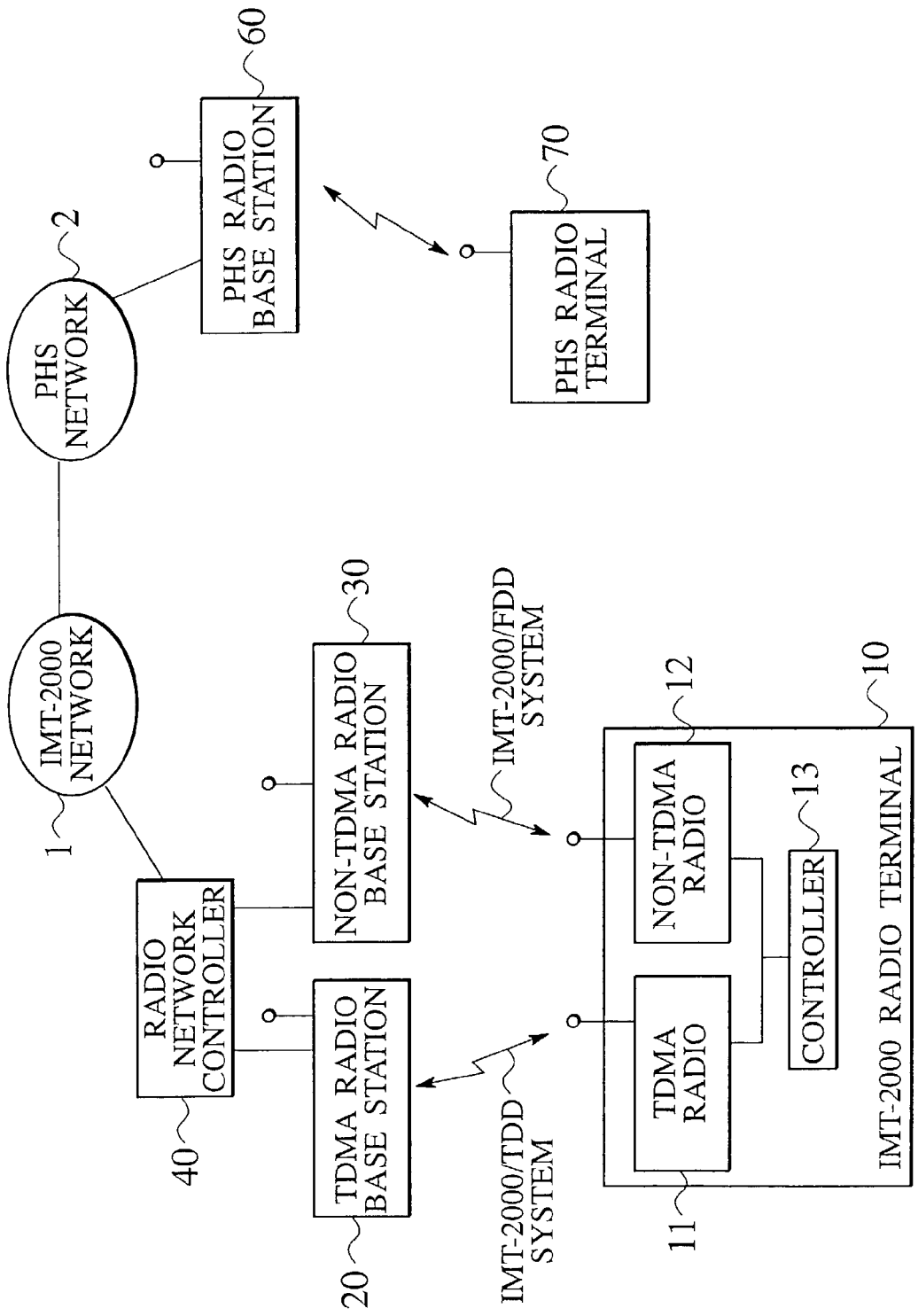

| n | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| AveIn | 3 | 3 | 2 | 3 | 3 | 9 | 8 | 5 | 5 | 5 | 5 | 5 | 4 | 8 | 7 |

$131_n$

RADIO COMMUNICATIONS SYSTEM, RADIO COMMUNICATIONS METHOD, RADIO RELAY, AND RADIO TERMINAL

CROSS REFERENCE TO RELATED APPLICATIONS

This application is based on and claims the benefit of priority from the Japanese Patent Application No. P2001-190368, filed on Jun. 22, 2001, the entire contents of which are incorporated herein by reference.

BACKGROUND OF THE INVENTION

1. Field of the Invention

The present invention relates to techniques for reducing, in a radio communications system, interference from another radio communications system.

2. Description of Relevant Art

There is known an IMT-2000 (International Mobile Telecommunications-2000) system enabling high-rate communications of 2 Mbps at maximum, in the field of mobile radio communications, such as portable telephone communications, where spreading needs are observed for high-rate data communications.

The IMT-2000 system provides two standards of communications system, an IMT-2000/FDD (Frequency Division Duplex) system and an IMT-2000/TDD (Time Division Duplex) system.

The IMT-2000/FDD system employs, as access methods therefore, a CDMA (Code Division Multiple Access) and an FDMA (Frequency Division Multiple Access). The system is advantageous, to the IMT-2000/TDD system, in that it can have a wider service area, and is expected to be used principally for low-rate data communications about 384 kbps as well as audio communications.

The IMT-2000/TDD system employs, as access methods therefore, the CDMA and the FDMA, and besides a TDMA (Time Division Multiple Access). This system is advantageous in that the ratio between up-going traffic and down-going traffic can be freely changed, and is expected to be used principally for high-rate data communications above 384 kbps.

FIG. 1 schematically diagrams a radio communications system, which has an IMT-2000 system and a PHS (Personal Handyphone System) system mixed in an identical service area, so that an IMT-2000/FDD system and an IMT-2000/TDD system mixed in an identical service area.

As shown in FIG. 1, the IMT-2000 system is configured with an IMT-2000 radio terminal 10, a TDMA radio base station (IMT-2000/TDD radio base station) 20, a non-TDMA radio base station (IMT-2000/FDD radio base station) 30 and a radio network controller 40.

The IMT-2000 radio terminal 10 is provided with a TDMA radio (IMT-2000/TDD radio) 11, a non-TDMA radio (IMT-2000/FDD radio) 12, and a controller 13.

The TDMA radio 11 performs radio communications with a TDMA radio base station 20 via radio channels of the IMT-2000/TDD system. The non-TDMA radio 12 performs radio communications with a non-TDMA radio base station 30 via radio channels of the IMT-2000/FDD system. The controller 13 is connected to, for controlling, the TDMA radio 11 and the non-TDMA radio 12.

The IMT-2000 radio terminal 10, provided with both a function of the IMT-2000/TDD system (TDMA radio 11) and a function of the IMT-2000/FDD system (non-TDMA radio 12), has both an advantage of the IMT-2000/TDD system, which is adapted for high-rate data communications, and an advantage of the IMT-2000/FDD system, which is adapted for wide service area.

The TDMA radio base station 20 performs radio communications with the TDMA radio 11 of the IMT-2000 radio terminal 10 via radio channels of the IMT-2000/TDD system. The TDMA radio base station 20 is connected to a radio network controller 40. Further, the TDMA radio base station 20 is adapted, for indication of a possible call connection via radio channels of the TDMA system, to always transmit a control signal indicating this effect.

The non-TDMA radio base station 30 performs radio communications with the non-TDMA radio 12 of the IMT-2000 radio terminal 10 via radio channels of the IMT-2000/FDD system. Also the non-TDMA radio base station 30 is connected to the radio network controller 40. Further, the non-TDMA radio base station 30 is adapted, for indication of a possible call connection via radio channels of the non-TDMA system (FDMA system or CDMA system), to always transmit a control signal indicating this effect.

The control signal transmitted from the TDMA radio base station 20 and the control signal transmitted from the non-TDMA radio base station 30 are different from each other.

The radio network controller 40, connected to the TDMA radio base station 20 and the non-TDMA radio base station 30, is adapted for controlling them to allot radio channels to the IMT-2000 radio terminal 10. The radio network controller 40 is further connected, via an IMT-2000 network 1, to other radio network controllers, as well as to a PHS network 2, a stationary telephone network, a mobile telephone network, etc.

As shown in FIG. 1, the PHS system is configured with a PHS radio base station 60 and a PHS radio 70. The PHS radio base station 60 and the PHS radio 70 are connected to each other via radio channels. Further, the PHS radio base station 60 is connected, via a PHS network 2, to other PHS radio base stations, as well as to the IMT-2000 network 1, a stationary telephone network, a mobile telephone network, etc.

FIG. 2A shows the configuration of radio channels employed in the IMT-2000 system. As shown in FIG. 2A, the radio channels are configured with radio frames $130_1$ to $130_n$, the radio frames being respectively configured with radio slots $131_1$ to $131_{15}$.

Each radio frame $130_1$ to $130_n$ has 15 radio slots $131_1$ to $131_{15}$, as in FIG. 2A. The radio frames $130_1$ to $130_n$ have a time length of 10 ms.

In the IMT-2000/FDD system, every radio slot $131_1$ to $131_{15}$ of a respective radio frame $130_1$ to $130_n$ has a single radio channel allotted thereto. In the IMT-2000/TDD system, every radio slot $131_1$ to $131_{15}$ of a respective radio frame $130_1$ to $130_n$ can have a different radio channel allotted thereto.

FIG. 2B shows the configuration of radio channels employed in the PHS system. As shown in FIG. 2B, the radio channels are configured with radio frames $132_1$ to $132_n$, the radio frames being respectively configured with radio slots $133_1$ to $133_8$.

Each radio frame $132_1$ to $132_n$ has 8 radio slots $133_1$ to $133_8$, as in FIG. 2B. The radio frames $132_1$ to $132_n$ have a time length of 5 ms.

The IMT-2000 system and the PHS system, if mixed in an identical service area as described, have mutual interference therebetween. In particular, the mutual interference increases, in case the non-TDMA radio base station 30 and the PHS radio base station 60 are located near to each other, or when the non-TDMA radio 12 of the IMT-2000 radio terminal 10 and the PHS radio terminal 70 perform communications in vicinities thereof.

Description is made below of the mutual interference between the IMT-2000/FDD system and the PHS system.

The IMT-2000/FDD system is a radio communications system of a non-TDMA system, which always has radio waves transmitted from a non-TDMA radio 12 of an IMT-2000 radio terminal 10 and a non-TDMA radio base station 30.

The PHS system is a radio communications system of a TDMA system, which has radio waves transmitted, like a burst with a period of 5 ms, from a PHS radio terminal 70 and a PHS radio base station 60.

As a result, the IMT-2000/FDD system undergoes, with the period of 5 ms, burst-like interference from PHS system, with a deteriorated quality of radio communications.

As a solution, a known method increases signal transmission power of the non-TDMA radio 12 of the IMT-2000 radio terminal 10 or the non-TDMA radio base station 30, when the interference from the PHS system is increased at the IMT-2000/FDD system.

However, this method, in which the burst-like interference from the PHS system is short in time, tends to suffer from the influence of a delay between from when interference from the PHS system is measured at the IMT-2000/FDD system to when signal transmission power is increased at the non-TDMA radio 12 of the IMT-2000 radio terminal 10 or the non-TDMA radio base station 30, so that the method has a small reduction in deterioration of radio communications quality, as a problem.

Further, the PHS system suffers from increased interference from the IMT-2000/FDD system, as the signal transmission power is increased at the non-TDMA radio 12 of the IMT-2000 radio terminal 10 or the non-TDMA radio base station 30, as another problem.

SUMMARY OF THE INVENTION

The present invention has been made with the points in view. It therefore is an object of the invention to effect a switching into radio communications of a TDMA system (IMT-2000/TDD system) depending on a result of measurements of degrees of interference in respective radio slots of a radio communications system (IMT-2000/FDD system) of a non-TDMA system (IMT-2000/FDD system), thereby avoiding use of radio slots great of interference, with a reduced deterioration of radio communications quality.

To achieve the object, a first aspect of the invention provides a system for radio communications, in which a radio terminal and a radio relay perform radio communications therebetween by a radio communications system else than a time division multiple access (TDMA) system, comprising an interference measurer implemented to measure a degree of interference of each of radio slots constituting a radio channel employed in the radio communications system, a decision maker implemented to make a decision, depending on a measurement result of the degree of interference, whether or not the radio communications by the radio communications system is able to be continued, and a switcher implemented to switch, as the decision is made of the radio communications by the radio communications system to be unable to be continued, the radio communications system to a radio communications system of the time division multiple access (TDMA) system.

A second aspect of the invention provides a method for radio communications, in which a radio terminal and a radio relay perform radio communications therebetween by a radio communications system else than a time division multiple access (TDMA) system, comprising measuring a degree of interference of each of radio slots constituting a radio channel employed in the radio communications system, making a decision, depending on a measurement result of the degree of interference, whether or not the radio communications by the radio communications system is able to be continued, and switching, as the decision is made of the radio communications by the radio communications system to be unable to be continued, the radio communications system to a radio communications system of the time division multiple access (TDMA) system.

A third aspect of the invention provides a radio relay, which performs radio communications with a radio terminal by a radio communications system else than a lime division multiple access (TDMA) system, comprising a switcher implemented, as the radio terminal has measured a degree of interference of each of radio slots constituting a radio channel employed in the radio communications system, made a decision, depending on a measurement result of the degree of interference, whether or not the radio communications by the radio communications system is able to be continued, and had the decision made of the radio communications by the radio communications system to be unable to be continued, to switch the radio communications system to a radio communications system of the time division multiple access (TDMA) system.

A fourth aspect of the invention provides a radio relay, which performs radio communications with a radio terminal by a radio communications system else than a time division multiple access (TDMA) system, comprising a switcher implemented, as the radio terminal has measured a degree of interference of each of radio slots constituting a radio channel employed in the radio communications system, determined a maximum of the degree of interference and a minimum of the degree of interference within a prescribed period, in dependence on the measurement result of the degree of interference, compared a result of operations using the maximum of the degree of interference and the minimum of the degree of interference determined to a prescribed threshold, to make the decision whether or not the radio communications by the radio communications system is able to be continued, and had the decision made of the radio communications by the radio communications system to be unable to be continued, to switch the radio communications system to a radio communications system of the time division multiple access (TDMA) system.

A fifth aspect of the invention provides a radio relay, which performs radio communications with a radio terminal by a radio communications system else than a time division multiple access (TDMA) system, comprising an interference measurer implemented to measure a degree of interference of each of radio slots constituting a radio channel employed in the radio communications system, a decision maker implemented to make a decision, depending on a measurement result of the degree of interference, whether or not the radio communications by the radio communications system is able to be continued, and a switcher implemented to switch, as the decision is made of the radio communications by the radio communications system to be unable to be continued, the radio communications system to a radio communications system of the time division multiple access (TDMA) system.

A sixth aspect of the invention provides a radio terminal, which performs radio communications with a radio relay by a radio communications system else than a time division multiple access (TDMA) system, comprising an interference measurer implemented to measure a degree of interference of each of radio slots constituting a radio channel employed in the radio communications system, a decision maker implemented to make a decision, depending on a measurement result of the degree of interference, whether or not the radio communications by the radio communications system is able to be continued, and an informer implemented to inform the radio relay of a result of the decision.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 1 is a schematic diagram of the configuration of a radio communications system according to an embodiment of the invention;

DETAILED DESCRIPTION OF THE PREFERRED EMBODIMENTS

Figure 2A:
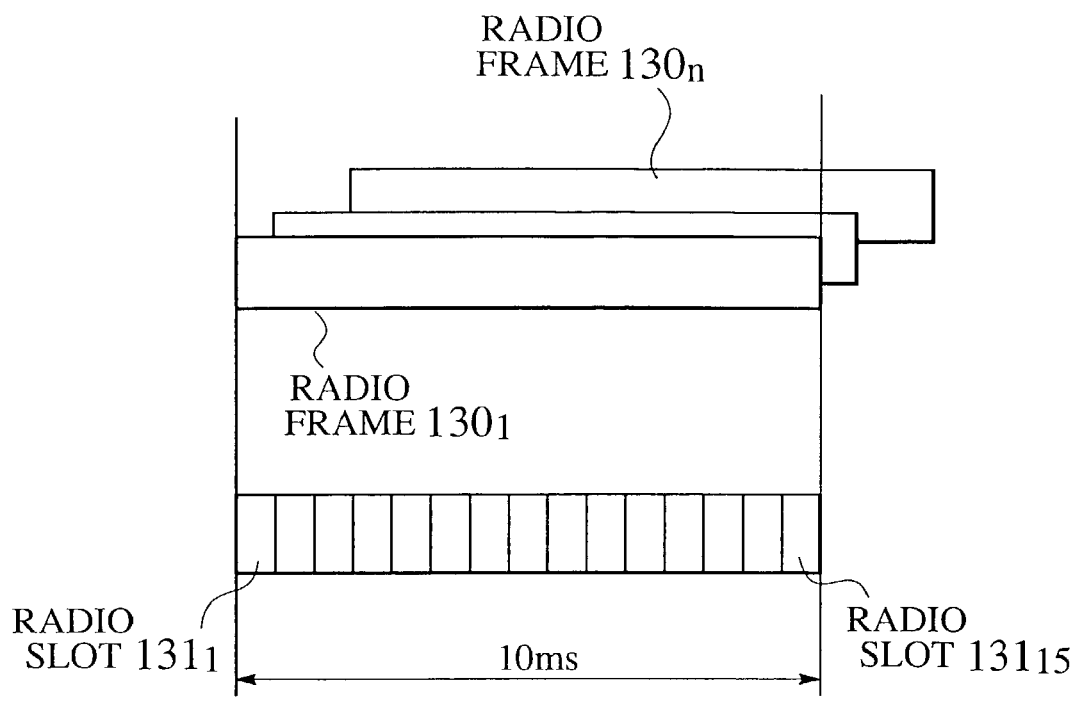
FIG. 2A and FIG. 2B are illustrative formats of radio channels employed in the radio communications system according to the embodiment of the invention.
Figure 2B:
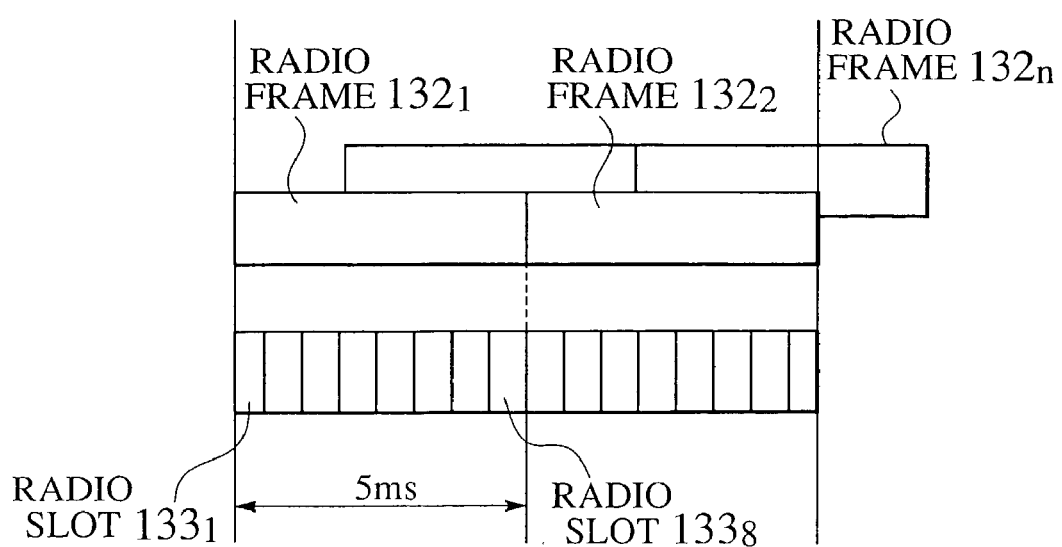

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following description, numerous specific details are set forth such as specific signal values, etc. to provide a through understanding of the present invention. However, it will be obvious to those skilled in the art that the present invention may be practiced without such specific details. In other instances, well-known circuits have been shown in block diagram form in order not to obscure the present invention in unnecessary detail.

(Configuration of Radio Communications System According to Embodiment of the Invention)

Here is described the configuration of a radio communications system according to an embodiment of the invention, with reference to associated drawings. FIG. 1 schematically diagrams the configuration of an IMT-2000 system as the radio communications system according the embodiment, as well as of a PHS system influential with interference thereto.

In this embodiment, the radio communications system is implemented as an IMT-2000 system for performing radio communications of a TDMA system (IMT-2000/TDD system), with reduced influences of interference from a PHS system in radio communications (by a non-TDMA system, i.e., in radio communications performed by any radio communications system else than the TDMA system) between a non-TDMA radio (IMT-2000/FDD radio) 12 of an IMT-2000 radio terminal 10 and an IMT-2000/FDD radio base station 30.

In this embodiment, as shown in FIG. 1, the radio communications system (IMT-2000 system) is configured with the IMT-2000 radio terminal 10, a TDMA radio base station (IMT-2000/TDD base station) 20, the non-TDMA radio base station (IMT-2000/FDD base station) 30, and a radio network controller 40.

A radio relay is configured as a combination of the TDMA radio base station 20, the non-TDMA radio base station 30, and the radio network controller 40.

The IMT-2000 radio terminal 10 is configured with a TDMA radio (IMT-2000/TDD radio) 11, the non-TDMA radio (IMT-2000/FDD) 12, and a controller 13.

The controller 13, connected to, for controlling, the TDMA radio 11 and the non-TDMA radio 12, is implemented for measuring interference in respective radio slots of the non-TDAMA radio 12, and responsible for the results to make a decision to or not to switch the radio communications system of the non-TDMA radio 12 from non-TDMA system (IMT-2000/FDD system) to TDMA system (IMT-2000/TDD system).

Figure 3:
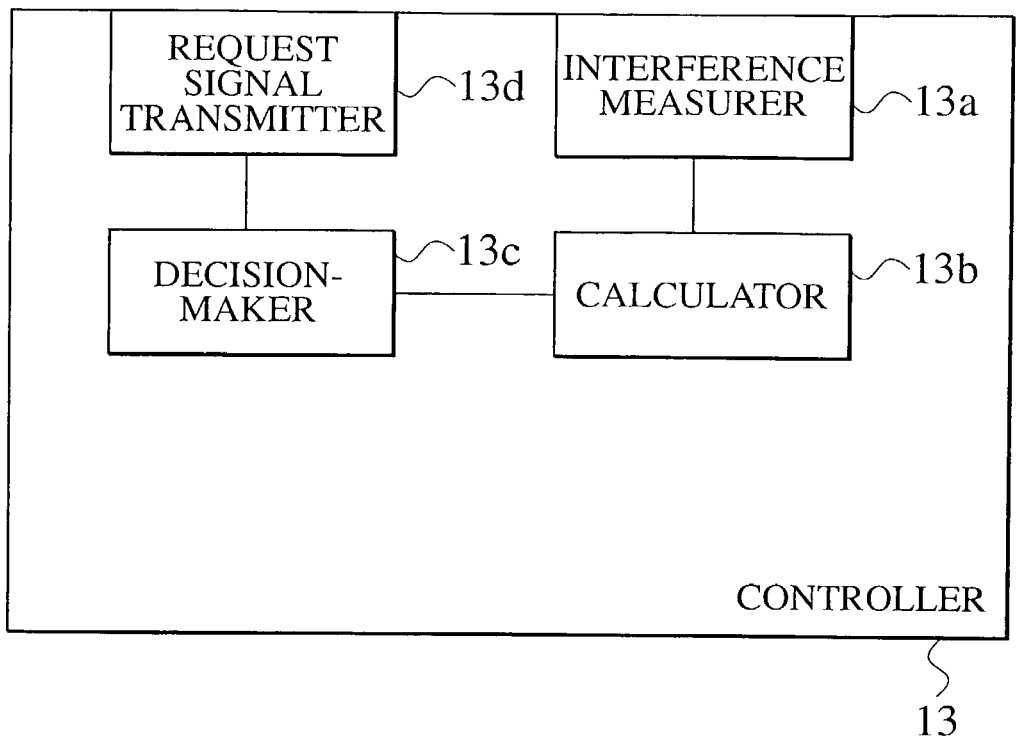
FIG. 3 is a functional block diagram of a controller of a radio terminal of the radio communications system according to the embodiment of the invention.

More specifically, as shown in FIG. 3, the controller 13 is configured with an interference measurer 13$a$, a calculator 13$b$, a decision-maker 13$c$, and a request signal transmitter 13$d$. The calculator 13$b$ is cooperative with the decision-maker 13$c$ to constitute a decision maker in this embodiment of radio communications system.

The interference measurer 13$a$, connected to the non-TDMA radio and the calculator 13$b$, serves as an interference measurer for measuring interference in respective radio slots $131_1$ to $131_{15}$ of radio frames $130_1$ to $130_n$ used in the non-TDMA radio 12. The non-TDMA radio 12 employs a radio channel format shown in FIG. 2A, which is analogous to a conventional one.

The calculator 13$b$, connected to the interference measurer 13$a$ and the decision-maker 13$c$, serves for executing various calculations based on interference measured by the interference measurer 13$a$, to transmit results of the calculation to the decision-maker 13$c$. The calculator 13$b$ is implemented to determine, for example, a maximum and a minimum in degree of interference within a prescribed interval with respect to the interference measured by the interference measurer 13$a$, and execute, for example, calculations to determine a difference or ratio between determined values of the maximum and the minimum in degree of interference within the prescribed interval.

The decision-maker 13$c$, connected to the calculator 13$b$ and the request signal transmitter 13$d$, is implemented, on basis of calculation results transmitted from the calculator 13$b$, for making a decision to or not to switch the radio communications system of the non-TDMA radio 12 from non-TDMA system (IMT-2000/FDD system) to TDMA-2000 system (IMT-2000/TDD system). Upon a decision to perform the switch, this effect is noticed from the decision-maker 13$c$ to the request signal transmitter 13$d$.

The request signal transmitter 13$d$, connected to the non-TDMA radio 12 and the decision-maker 13$c$ responds to the notice from the decision-maker 13$c$, by transmitting a request signal for requesting the switch of radio communications system to the radio network controller 40, via the non-TDMA radio 12 and the non-TDMA radio base station.

The TDMA radio 11 and the non-TDMA radio 12 are analogous in function to a TDMA radio and a non-TDMA radio implementing conventional art, respectively.

Also the TDMA radio base station 20 and the non-TDMA radio base station 30 are analogous in function to a TDMA radio base station and a non-TDMA radio base station implementing conventional art, respectively.

The radio network controller 40, connected to the TDMA radio base station 20 and the non-TDMA radio base station 30, is implemented for controlling them to allot radio channels to the IMT-2000 radio terminal 10.

The radio network controller 40 is further connected, via an IMT-2000 network 1, to other radio network controllers, as well as to a PHS network 2, a stationary telephone network, a mobile telephone network, etc.

Figure 4:
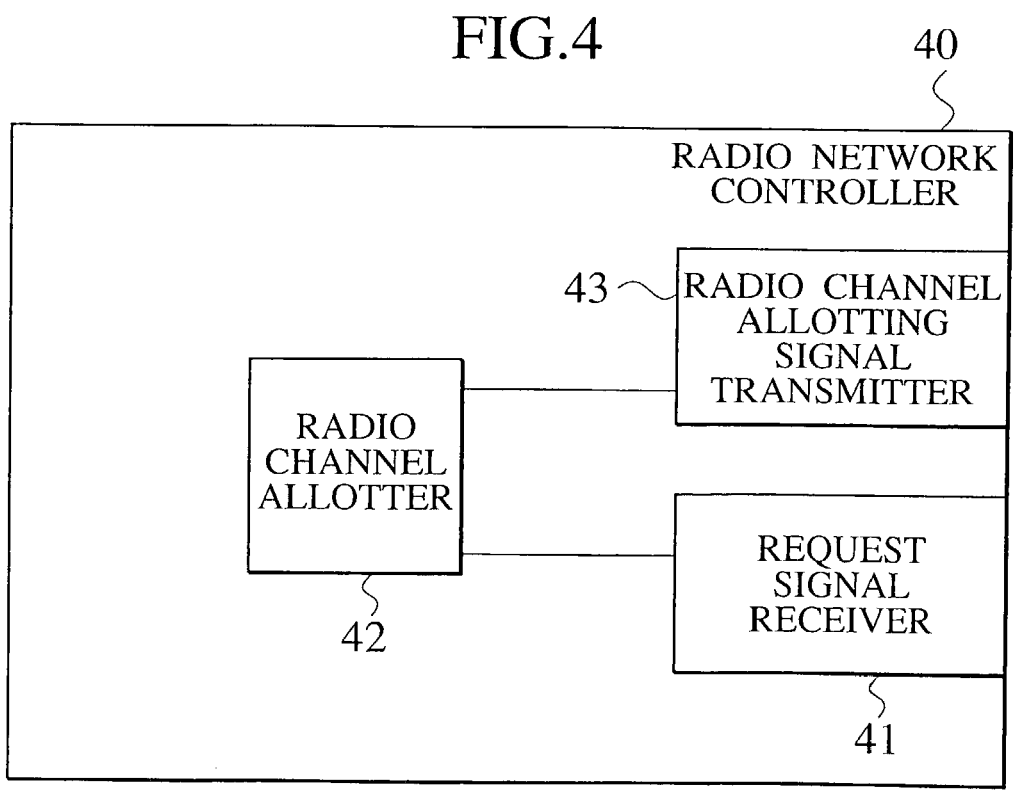
FIG. 4 is a functional block diagram of a radio network controller of a radio terminal of the radio communications system according to the embodiment of the invention.

More specifically, as shown in FIG. 4, the radio network controller 40 is configured with a request signal receiver 41, a radio channel allotter 42, and a radio channel allotting signal transmitter 43. The radio channel allotter 42 is configured as a switcher in this embodiment of radio communications system.

The request signal receiver 41, connected to the non-TDMA radio base station 30 and the radio channel allotter 42, is implemented to receive the request signal from the non-TDMA radio base station, and transmit the received request signal to the radio channel allotter 42.

The radio channel allotter 42, connected to the request signal receiver 41 and the radio channel allotting signal transmitter 43, is implemented, in order for radio communications having been performed in the non-TDMA system between the non-TDMA radio base station 30 and the non-TDMA radio 12 of the IMT-2000 radio terminal 10 to be switched to the TDMA system in accordance with the request signal received from the request signal receiver 41, to work by generating a radio channel allotting signal for allotting, to that radio communications, radio channels employed between the TDMA radio base station 20 and the TDMA radio 11 of the IMT-2000 radio terminal 10.

The radio channel allotter 42 transmits the generated radio channel allotting signal to the radio channel allotting signal transmitter 43.

The radio channel allotting signal transmitter 43, connected to the TDMA radio base station 20 and the radio channel allotter 43, is implemented for transmitting the radio channel allotting signal, as it is transmitted thereto from the radio channel allotter 43, to the TDMA radio base station 20 to thereby effect the above-noted switching.

(Radio Communications Method Using the Radio Communications System According to the Embodiment)

Figure 5:
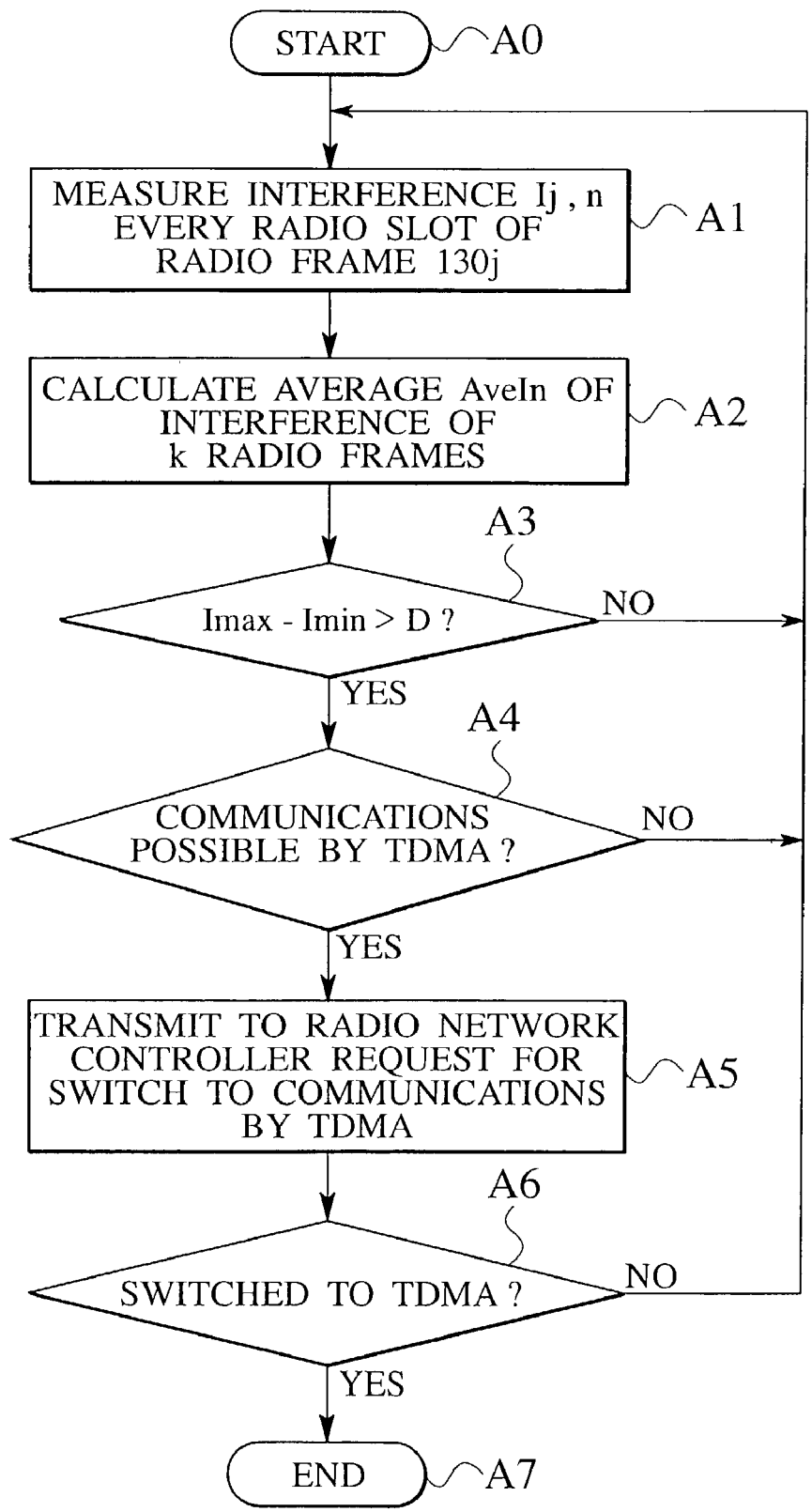
FIG. 5 is a flow chart of actions to reduce interference from another radio communications system in the radio communications system according to the embodiment of the invention.

The radio communications system configured as described can be used in a radio communications method to be executed with the following procedures. FIG. 5 is a flow chart of actions for switching the radio communications system (from the non-TDMA system to the TDMA system) to reduce interference from another radio communications system (PHS system).

At a step A0, as shown in FIG. 5, the non-TDMA radio 12 of the IMT-2000 radio terminal 10 and the non-TDMA radio base station 30 are performing radio communications therebetween by the non-TDMA system.

At a step A1, the interference measurer 13a of the controller 13 of the IMT-2000 radio terminal 10 measures interference in a respective radio slot $131_1$ to $131_{15}$ of radio frames $130_1$ to $130_n$ employed in the radio communications between the non-TDMA radio 12 and the non-TDMA radio base station 30. This interference includes interference from the PHS system. Interference of a radio slot $131_n$ at a radio frame $130_j$ is defined by $I_{j,n}$.

At a step A2, the calculator 13b of the controller 13 of the IMT-2000 radio terminal 10 calculates an average of interference in respective slots $131_1$ to $131_{15}$ of k radio frames $130_1$ to $130_k$. The value k is predetermined. Average of interference of the radio slot $131_n$ is defined by $AveI_n$. For example, the average $AveI_n$ is determined as shown in FIG. 6 for each slot $131_1$ to $131_{15}$.

Figures 6, 7:
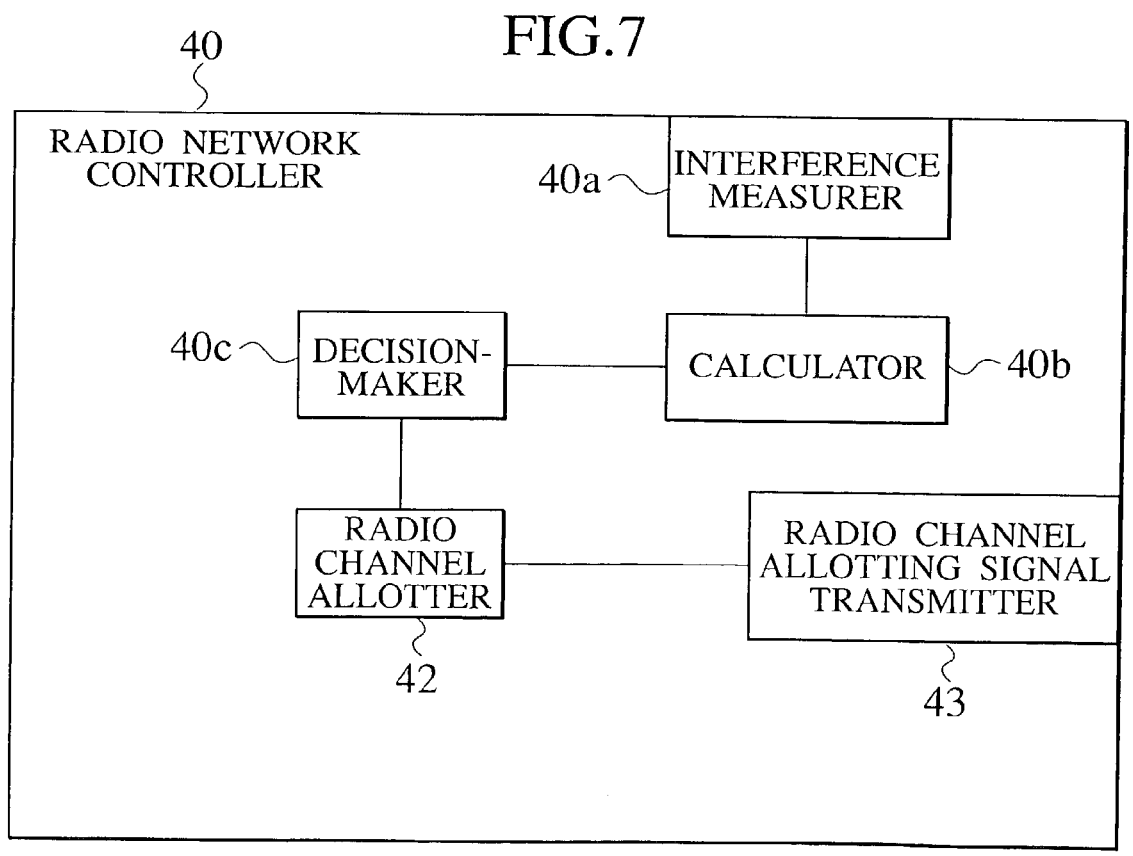
FIG. 6 is a diagrammatic illustration of average values of interference of radio slots employed in the radio communications system according to the embodiment of the invention.
FIG. 7 is a functional block diagram of a radio network controller of a radio communications system according to a modified embodiment of the invention.

At a step A3, the decision-maker 13c of the controller 13 of the IMT-2000 radio terminal 10 samples a maximum $I_{max}$ and a minimum $I_{min}$ out of interference averages $AveI_n$ shown in FIG. 6. In FIG. 6, the maximum $I_{max}$ is 9 ($AveI_6$), and the minimum $I_{min}$ is 2 ($AveI_3$). Then, the decision-maker 13c compares a value "$I_{max}-I_{min}$" with a prescribed threshold D. The value D is predetermined.

If "$I_{max}-I_{min}<=D$", the decision-maker 13c makes a decision for the radio communications of non-TDMA system to be continued, and the control flow of this process returns to the step A1. In case "$I_{max}-I_{min}>D$", the flow goes to a step A4, where the decision-maker 13c monitors if the TDMA radio 11 of the IMT-2000 radio terminal 10 is able to receive a control signal transmitted from the TDMA radio base station 20, that is, whether or not a TDMA radio base station 20 that performs radio communications of TDMA system is found within an area where the non-TDMA radio 12 of the IMT-2000 radio terminal 10 and the non-TDMA radio base station 30 are performing radio communications therebetween.

If the TDMA radio 11 of the IMT-2000 radio terminal 10 is unable to receive the control signal, the decision-maker 13c makes a decision for the radio communications of non-TDMA system to be continued, and the flow returns to the step A1. In case the TDMA radio 11 of the IMT-2000 radio terminal 10 is able to receive the control signal, the flow goes to a step A5, where the decision-maker 13c makes a decision for the radio communications to be switched from non-TDMA system to TDMA system, and informs the effect to the request signal transmitter 13d. In response to this information from the decision-maker 13c, the request signal transmitter 13d transmits a request signal for requesting the above-noted switching of radio communications system, to the radio network controller 40, via the non-TDMA radio 12 and the non-TDMA radio base station 30.

At a step A6, as the request signal receiver 41 of the radio network controller 40 has received the above-noted request signal, the radio channel allotter 42 is controlled to generate, in dependence on the request signal received from the request signal receiver 41, a radio channel allotting signal for allotting a radio channel between the TDMA radio base station 20 and the TDMA radio 11 of the IM-2000 radio terminal 10 to radio communications being performed by non-TDMA system between the non-TDMA radio base station 30 and the non-TDMA radio 12 of the IMT-2000 radio terminal 10. The radio channel allotter 42 is then controlled to allot, with a preference, a radio slot small of average $AveI_n$ out of radio slots $131_1$ to $131_{15}$ of radio frames $130_1$ to $130_n$ between the TDMA radio base station 20 and the TDMA radio 11 of the IM-2000 radio terminal 10. The radio channel allotter 42 then sends the generated radio channel allotting signal to the radio channel allotting signal transmitter 43. Then, the radio signal allotting signal transmitter 43 transmits the radio channel allotting signal to the TDMA radio base station 20. As a result, the radio communications having been performed by non-TDMA system between the non-TDMA radio base station 30 and the non-TDMA radio 12 is switched to a radio communications of TDMA system to be performed between the TDMA radio base station 20 and the TDMA radio 11.

At a step A7, the radio communications of TDMA system is performed between the TDMA radio base station 20 and the TDMA radio 11. In failure of the switching, the decision-maker 13c makes a decision for the radio communications of non-TDMA system to be continued, and the flow returns to the step A1.

(Functions and Effects of the Radio Communications System and the Radio Communications Method)

According to the embodiment, in a system for radio communications and a method for radio communications, as a decision is made by a decision-maker 13c of a controller 13 of an IMT-2000 radio terminal 10 that it is impossible to continue a radio communications of an IMT-2000/FDD system, a radio channel allotter 42 of a radio network controller 40 is allowed, in order to switch the IMT-2000/FDD system to an IMT2000/TDD system, to select, among a plurality of radio communications systems different such as in radio frequency or multiple access method, a radio communications system to be smallest of interference, as a radio communications system to be employed between the IMT-2000 radio terminal 10 and radio base station, with a reduced deterioration of radio communications quality, without increasing signal transmission power of the IMT-2000 radio terminal 10 and radio relays.

Moreover, according to the embodiment, in a system for radio communications and a method for radio communications, a decision decision-maker 13c of a controller 13 of an IMT-2000 radio terminal 10 compares a result of operations "$I_{max}-I_{min}$" using a maximum $I_{max}$ and a minimum $I_{min}$ of a degree of interference within a prescribed period to a prescribed threshold D, to make a decision whether or not a radio communication by an IMT-2000/FDD system is able to be continued, with a possible reduction in deterioration of communications quality due to burst-like interference.

Still more, as the interference from a radio communications system of a PHS system is burst-like at intervals of 5 ms and the radio communications system of the IMT-2000 system has a radio frame of 10 ms, the interference from the radio communications system of the PHS system to the radio communications system of the IMT-2000 system appears in identifiable radio slots 131₁ to 131₁₅.

According to the embodiment, therefore, in a system for radio communications and a method for radio communications, a radio channel allotter 42 of a radio network controller 40 is allowed to switch the radio communications system from IMT-2000/FDD to IMT-2000/TDD, allotting a radio slot small of interference, as a radio channel with a preference, with a reduced deterioration of radio communications quality.

(Modification 1)

The present invention is not limited to the embodiment described, which may preferably be modified by providing, as shown in FIG. 7 for example, a combination of an interference measurer 40a, a calculator 40b, and a decision-maker 40c to a radio network controller 40, in place of the combination of interference measurer 13a, calculator 13b, decision-maker 13c, request signal transmitter 13d, and request signal receiver 41.

Figure 8:
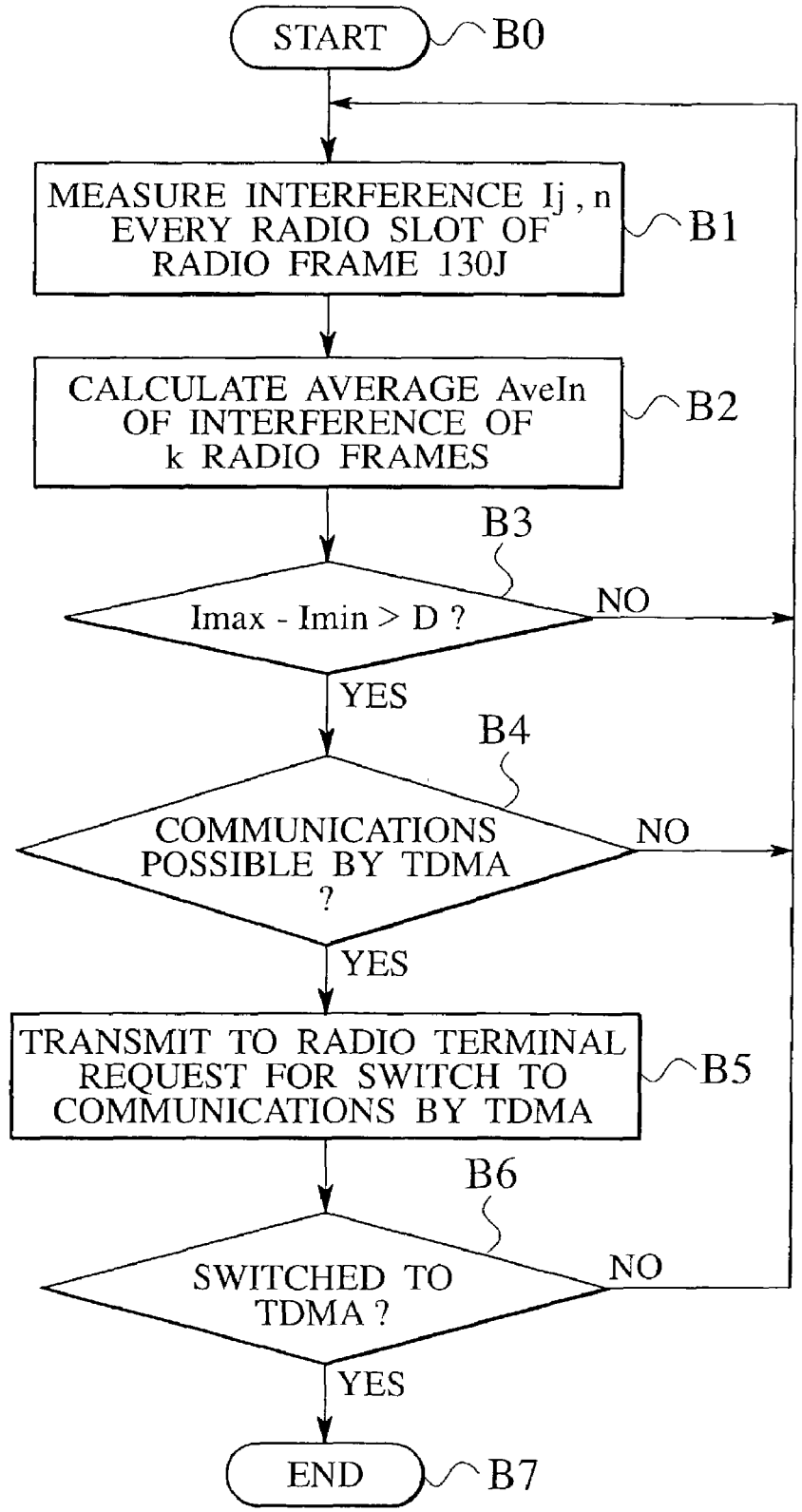
FIG. 8 is a flow chart of actions to reduce interference from another radio communications system in the radio communications system according to the modified embodiment of the invention.

FIG. 8 is a flow chart of actions of a radio communications system according to this modification, for switching a radio communications system (from a non-TDMA system to a TDMA system) to reduce interference from another radio communications system (PHS system).

At a step B0, as shown in FIG. 8, a non-TDMA radio 12 of an IMT-2000 radio terminal 10 and a non-TDMA radio base station 30 are performing radio communications therebetween by the non-TDMA system.

At a step B1, the interference measurer 40a of the radio network controller 40 measures interference in a respective radio slot 131₁ to 131₁₅ of radio frames 130₁ to 130ₙ employed in the radio communications between the non-TDMA radio 12 and the non-TDMA radio base station 30. This interference includes interference from the PHS system. Interference of a radio slot 131ₙ at a radio frame 130ⱼ is defined by $I_{j,n}$.

At a step B2, the calculator 40b of the radio network controller 40 calculates an average of interference in respective slots 131₁ to 131₁₅ of k radio frames 130₁ to 130ₖ. The value k is predetermined. Average of interference of the radio slot 131ₙ is defined by $AveI_n$.

At a step B3, the decision-maker 40c of the radio network controller 40 samples a maximum $I_{max}$ and a minimum $I_{min}$ out of interference averages $AveI_n$. Then, the decision-maker 40c compares a value "$I_{max}-I_{min}$" with a prescribed threshold D. The value D is predetermined.

If "$I_{max}-I_{min}<=D$", the decision-maker 40c makes a decision for the radio communications of non-TDMA system to be continued, and the control flow of this process returns to the step B1. In case "$I_{max}-I_{min}>D$", the flow goes to a step B4, where the decision-maker 40c monitors whether of not a TDMA radio base station 20 that performs radio communications of the TDMA system is found within an area where the non-TDMA radio 12 of the IMT-2000 radio terminal 10 and the non-TDMA radio base station 30 are performing radio communications therebetween.

If no TDMA radio base station 20 is found, the decision-maker 40c makes a decision for the radio communications of non-TDMA system to be continued, and the flow returns to the step B1. In case the TDMA radio base station 20 is found, the flow goes to a step B5, where the decision-maker 40c makes a decision for the radio communications to be switched from the non-TDMA system to the TDMA system, and informs the effect to a radio channel allotter 42. Then, in response to this information, the radio channel allotter 42 is controlled to generate a radio channel allotting signal for allotting a radio channel between the TDMA radio base station 20 and the TDMA radio 11 of the IM-2000 radio terminal 10 to radio communications being performed by the non-TDMA system between the non-TDMA radio base station 30 and the non-TDMA radio 12 of the IMT-2000 radio terminal 10. The radio channel allotter 42 is then controlled to allot, with a preference, a radio slot small of average $AveI_n$ out of radio slots 131₁ to 131₁₅ of radio frames 130₁ to 130ₙ between the TDMA radio base station 20 and the TDMA radio 11 of the IM-2000 radio terminal 10. The radio channel allotter 42 then sends the generated radio channel allotting signal to a radio channel allotting signal transmitter 43. Then, the radio signal allotting signal transmitter 43 transmits the radio channel allotting signal to the TDMA radio base station 20 and the IMT-2000 radio terminal 10.

At a step B6, the radio communications having been performed by the non-TDMA system between the non-TDMA radio base station 30 and the non-TDMA radio 12 is switched to a radio communications of the TDMA system to be performed between the TDMA radio base station 20 and the TDMA radio 11.

At a step B7, the radio communications of the TDMA system is performed between the TDMA radio base station 20 and the TDMA radio 11. In failure of the switching, the decision-maker 40c makes a decision for the radio communications of the non-TDMA system to be continued, and the flow returns to the step B1.

(Modification-2)

The present invention is not limited to the embodiments described, which may preferably be modified by use such as of a power ratio between a desirable signal and an interference signal (signal power to interference power ratio) or a signal error rate, in place f calculations of the calculator 13b of controller 13 of IMT-2000 radio terminal 10 and the calculator 40b of radio network controller 40. In this modification, a decision-maker 13c of a controller 13 of an IMT-2000 radio terminal 10 as well as a decision-maker 40c of a radio network controller 40 is controlled to make a decision to switch the radio communications system of a non-TDMA radio 12 from the non-TDMA system (IMT-2000/FDD system) to a TDMA system (IMT-2000/TDD system), simply when a prescribed threshold is exceeded by the signal power to interference power ratio or the signal error rate.

Moreover, at a step A3 or B3, a decision-maker 13c of the controller 13 of the IMT-2000 radio terminal 10 and a decision-maker 40c of the radio network controller 40 may preferably employ "$I_{max}/I_{min}$" in place of "$I_{max}-I_{min}$".

samples a maximum $I_{max}$ and a minimum $I_{min}$ out of interference averages $AveI_n$. Then, the decision-maker 40c compares a value "$I_{max}-I_{min}$" with a prescribed threshold D. The value D is predetermined.

Further, the radio communications of a radio communications system (IMT-2000/FDD system) subjected to the influence of interference from another system may preferably be switched to such a radio communications system as a PDC (Personal Digital Cellular) or a GSM (Global System for Mobile Communications), in place of the switching to the IMT-2000/TDD system. As the frequency interval between the PHS system and the PDC or GSM system is greater than between the PHS system and the IM-2000 system, the noise power from the PS system to the PDC or GSM system becomes smaller than from the PHS system to the IMT-2000 system, with the more reduced interference from the PHS system.

As will be seen from the foregoing description, according to the invention, an interference measurer 13a of a controller 13 of an IMT-2000 radio terminal 10 or an interference measurer 40a of a radio network controller 40 measures a degree of interference of each of radio slots $131_1$ to $131_{15}$, a combination of a calculator 13b and a decision-maker 13c of the controller 13 of the IMT-2000 radio terminal 10 or a combination of a calculator 40b and a decision-maker 40c of the radio network controller 40 makes a decision, depending on a measurement result of the degree of interference, whether or not the radio communications by the IMT-2000/FDD system is able to be continued, and as a result of the decision, when a radio channel allotter 42 makes a decision for the radio communications by the IMT-2000/FDD system is unable to be continued, the radio communications of IMT-2000/FDD system is switched to a radio communications of IMT-2000/TDD system, avoiding use of radio slots large of interference, with a possible reduction in deterioration of communications quality.

Various modifications will become possible for those skilled in the art after receiving the teachings of the present disclosure without departing from the spirit or scope thereof.

What is claimed is:

1. A system for radio communications, in which a radio terminal and a radio relay perform radio communications therebetween by a radio communications system using either a code division multiple access/frequency division duplex (CDMA/FDD) or a frequency division multiple access/frequency division duplex (FDMA/FDD), comprising:

an interference measurer implemented to measure a degree of interference of each of radio slots constituting a radio channel employed in the radio communications system using either the CDMA/FDD or the FDMA/FDD;

a decision maker implemented to make a decision, depending on a measurement result of the degree of interference, whether or not the radio communications by the radio communications system using either the CDMA/FDD or the FDMA/FDD is able to be continued; and a switcher implemented to switch, as the decision is made of the radio communications by the radio communications system to be unable to be continued, the radio communications system using either the CDMA/FDD or the FDMA/FDD to a radio communications system using either a time division multiple access/time division duplex (TDMA/TDD) or a code division multiple access/time division duplex (CDMA/TDD) or a frequency division multiple access/time division duplex (FDMA/TDD), wherein the switcher is implemented, upon the switching, to preferentially allot a radio slot having a smallest degree of interference measured by the interference measurer among the radio slots employed in the radio communications system using either the CDMA/FDD or the FDMA/FDD, as a radio channel employed in the radio communications system using either the TDMA/TDD or the CDMA/TDD or the FDMA/TDD.

2. A system for radio communications according to claim 1, wherein the decision maker is implemented to determine a maximum of the degree of interference and a minimum of the degree of interference within a prescribed period, in dependence on the measurement result of the degree of interference, and compare a result of operations using the maximum of the degree of interference and the minimum of the degree of interference determined to a prescribed threshold, to make the decision whether or not the radio communications by the radio communications system using either the CDMA/FDD or the FDMA/FDD is able to be continued.

3. A method for radio communications, in which a radio terminal and a radio relay perform radio communications therebetween by a radio communications system using either a code division multiple access/frequency division duplex (CDMA/FDD) or a frequency division multiple access/frequency division duplex (FDMA/FDD), comprising:

measuring a degree of interference of each of radio slots constituting a radio channel employed in the radio communications system using either the CDMA/FDD or the FDMA/FDD;

making a decision, depending on a measurement result of the degree of interference, whether or not the radio communications by the radio communications system using either the CDMA/FDD or the FDMA/FDD is able to be continued;

switching, as the decision is made of the radio communications by the radio communications system using either the CDMA/FDD or the FDMA/FDD to be unable to be continued, the radio communications system using either the CDMA/FDD or the FDMA/FDD to a radio communications system using either a time division multiple access/time division duplex (TDMA/TDD) or a code division multiple access/time division duplex (CDMA/TDD) or a frequency division multiple access/time division duplex (FDMA/TDD); and preferentially allotting, upon the switching, a radio slot having a smallest degree of interference, as measured by the measuring, among the radio slots employed in the radio communications system using either the CDMA/

FDD or the FDMA/FDD, as a radio channel employed in the radio communications system using either the TDMA/TDD or the CDMA/TDD or the FDMA/TDD.

4. A method for radio communications according to claim 3, wherein the making the decision comprising determining a maximum of the degree of interference and a minimum of the degree of interference within a prescribed period, in dependence on the measurement result of the degree of interference, and comparing a result of operations using the maximum of the degree of interference and the minimum of the degree of interference determined to a prescribed threshold, to make the decision whether or not the radio communications by the radio communications system using either the CDMA/FDD or the FDMA/FDD is able to be continued.

5. A radio relay, which performs radio communications with a radio terminal by a radio communications system using either a code division multiple access/frequency division duplex (CDMA/FDD) or a frequency division multiple access/frequency division duplex (FDMA/FDD), comprising:
 a switcher implemented as the radio terminal has measured a degree of interference of each of radio slots constituting a radio channel employed in the radio communications system using either the CDMA/FDD or the FDMA/FDD, made a decision, depending on a measurement result of the degree of interference, whether or not the radio communications by the radio communications system using either the CDMA/FDD or the FDMA/FDD is able to be continued, and had the decision made of the radio communications by the radio communications system using either the CDMA/FDD or the FDMA/FDD to be unable to be continued, to switch the radio communications system using either the CDMA/FDD or the FDMA/FDD to a radio communication system using a time division multiple access/time division duplex (TDMA/TDD) or a code division multiple access/time division duplex (CDMA/TDD) or a frequency division multiple access/time division duplex (FDMA/TDD),
 wherein the switcher is implemented, upon the switching, to preferentially allot a radio slot having a smallest degree of measured interference among the radio slots employed in the radio communications system using either the CDMA/FDD or the FDMA/FDD, as a radio channel employed in the radio communications system using either the TDMA/TDD or the CDMA/TDD or the FDMA/TDD.

6. A radio relay, which performs radio communications with a radio terminal by a radio communications system using either a code division multiple access/frequency division duplex (CDMA/FDD) or a frequency division multiple access/frequency division duplex (FDMA/FDD), comprising:
 a switcher implemented, as the radio terminal has measured a degree of interference of each of radio slots constituting a radio channel employed in the radio communications system using either the CDMA/FDD or the FDMA/FDD, determined a maximum of the degree of interference and a minimum of the degree of interference within a prescribed period, in dependence on the measurement result of the degree of interference, compared a result of operations using the maximum of the degree of interference and the minimum of the degree of interference determined to a prescribed threshold, to make the decision whether or not the radio communications by the radio communications system using either the CDMA/FDD or the FDMA/FDD is able to be continued, and had the decision made of the radio communications by the radio communications system using either the CDMA/FDD or the FDMA/FDD to be unable to be continued, to switch the radio communications system using either the CDMA/FDD or the FDMA/FDD to a radio communications system using either a time division multiple access/time division duplex (TDMA/TDD) or a code division multiple access/time division duplex (CDMA/TDD) or a frequency division multiple access/time division duplex (FDMA/TDD),
 wherein the switcher is implemented, upon the switching, to preferentially allot a radio slot having a smallest degree of measured interference among the radio slots employed in the radio communications system using either the CDMA/FDD or the FDMA/FDD, as a radio channel employed in the radio communications system using either the TDMA/TDD or the CDMA/TDD or the FDMA/TDD.

7. A radio relay, which performs radio communications with a radio terminal by a radio communications system using either a code division multiple access/frequency division duplex (CDMA/FDD) or a frequency division multiple access/frequency division duplex (FDMA/FDD), comprising:
 an interference measurer implemented to measure a degree of interference of each of radio slots constituting a radio channel employed in the radio communications system using either the CDMA/FDD or the FDMA/FDD;
 a decision maker implemented to make a decision, depending on a measurement result of the degree of interference, whether or not the radio communications by the radio communications system using either the CDMA/FDD or the FDMA/FDD is able to be continued; and
 a switcher implemented to switch, as the decision is made of the radio communications by the radio communications system using either the CDMA/FDD or the FDMA/FDD to be unable to be continued, the radio communications system using either the CDMA/FDD or the FDMA/FDD to a radio communications system using either a time division multiple access/time division duplex (TDMA/TDD) or a code division multiple access/time division duplex (CDMA/TDD) or a frequency division multiple access/time division duplex (FDMA/TDD),
 wherein the switcher is implemented, upon the switching, to preferentially allot a radio slot having a smallest degree of interference measured by the interference measurer among the radio slots employed in the radio communications system using either the CDMA/FDD or the FDMA/FDD, as a radio channel employed in the radio communications system using either the TDMA/TDD or the CDMA/TDD or the FDMA/TDD.

8. A radio relay according to claim 7, wherein the decision maker is implemented to determine a maximum of the degree of interference and a minimum of the degree of interference within a prescribed period, in dependence on the measurement result of the degree of interference, and compare a result of operations using the maximum of the degree of interference and the minimum of the degree of interference determined to a prescribed threshold, to make the decision whether or not the radio communications by the radio communications system using either the CDMA/FDD or the FDMA/FDD is able to be continued.

* * * * *